(12) United States Patent
Saito (10) Patent No.: US 10,727,721 B2
(45) Date of Patent: Jul. 28, 2020

(54) MOTOR WITH ENHANCED PROTECTION AGAINST NOISES

(71) Applicant: NIDEC SANKYO CORPORATION, Suwa-gun Nagano (JP)

(72) Inventor: Yutaka Saito, Suwa-gun Nagano (JP)

(73) Assignee: NIDEC SANKYO CORPORATION, Suwa-Gun, Nagano (JP)

( * ) Notice: Subject to any disclaimer, the term of this patent is extended or adjusted under 35 U.S.C. 154(b) by 218 days.

(21) Appl. No.: 16/013,389

(22) Filed: Jun. 20, 2018

(65) Prior Publication Data

US 2018/0375405 A1 Dec. 27, 2018

(30) Foreign Application Priority Data

Jun. 23, 2017 (JP) .................................. 2017-122935

(51) Int. Cl.

| H02K 11/02 | (2016.01) |
|---|---|
| H02K 11/22 | (2016.01) |
| G01D 5/245 | (2006.01) |
| H02K 29/08 | (2006.01) |
| H02K 1/28 | (2006.01) |
| H02K 11/215 | (2016.01) |
| H02K 11/40 | (2016.01) |
| H02K 21/22 | (2006.01) |
| H02K 1/27 | (2006.01) |
| G01D 5/244 | (2006.01) |

(52) U.S. Cl.
CPC ........... *H02K 11/022* (2013.01); *G01D 5/245* (2013.01); *G01D 5/2458* (2013.01); *G01D 5/24433* (2013.01); *H02K 1/2753* (2013.01); *H02K 1/28* (2013.01); *H02K 11/215* (2016.01); *H02K 11/40* (2016.01); *H02K 21/22* (2013.01); *H02K 29/08* (2013.01); *H02K 2211/03* (2013.01)

(58) Field of Classification Search
CPC .... H02K 11/022; H02K 11/215; H02K 11/40; H02K 1/2753; H02K 1/28; H02K 21/22; H02K 29/08; H02K 2211/03; G01D 5/24433; G01D 5/245; G01D 5/2458
See application file for complete search history.

(56) References Cited

U.S. PATENT DOCUMENTS

| 6,411,463 B1* | 6/2002 | Janik | .................... G11B 25/043 360/97.19 |
|---|---|---|---|
| 6,522,498 B1* | 2/2003 | Lim | .................... G11B 25/043 360/97.21 |
| 2011/0286185 A1* | 11/2011 | Abe | ...................... H02M 7/003 361/710 |

FOREIGN PATENT DOCUMENTS

JP 2016003888 A 1/2016

* cited by examiner

*Primary Examiner* — Emily P Pham
(74) *Attorney, Agent, or Firm* — Cantor Colburn LLP (57) ABSTRACT

A motor may include a motor main body having a turning shaft and a motor case; a magnet that turns together with the turning shaft; a magnetism sensing element that faces the magnet; a circuit board on which the magnetism sensing element is mounted, the circuit board having a signal ground that is connected to a ground terminal of the magnetism sensing element; a circuit board holder that covers the circuit board from a side of the magnet; and a first shield member that covers the circuit board from a side opposite to the magnet. The first shield member and the circuit board holder are each made of an electrically-conductive material, and electrically connected to the signal ground.

12 Claims, 10 Drawing Sheets

MOTOR WITH ENHANCED PROTECTION AGAINST NOISES

CROSS REFERENCE TO RELATED APPLICATION

The present invention claims priority under 35 U.S.C. § 119 to Japanese Application No. 2017-122935 filed Jun. 23, 2017, the entire content of which is incorporated herein by reference.

FIELD OF THE INVENTION

At least an embodiment of the present invention relates to a motor provided with an encoder for detecting a turn of a rotor by use of a magnetism sensing element.

BACKGROUND

In Patent Document 1, there is disclosed a motor provided with an encoder for detecting a turn of a rotor. In the motor that Patent Document 1 discloses, the encoder includes a magnetism sensing element installed on a circuit board, and a magnet that turns together with an output shaft of the motor. The circuit board is supported by a holder fixed to a motor case. The circuit board, on which the magnetism sensing element is installed, and the magnet are covered by a cover member. The cover member is fixed to an inside surface of an encoder case that is fixed to the motor case.

Patent Document

Patent Document 1: Japanese Unexamined Patent Application Publication No. 2016-3888

An encoder installed in a motor is affected by various noises, in such a way that an output changes according to an operation environment of a product, so that there exists a risk of a changing status of an angle error generation. For example, an output of a magnetism sensing element changes as a result of an effect of a magnetic noise and an electromagnetic noise by a disturbance magnetic field. Moreover, an output of a magnetism sensing element, and an amplified value of an output of a magnetism sensing element by an encoder circuit installed on a circuit board are in danger of being subject to an effect of an electrical noise, such as a frame ground noise of a motor main body, where the encoder is fixed, a power source noise, and the like.

As a countermeasure against such a noise, in the case of Patent Document 1; as a cover member for covering the circuit board, there is used a cover member made of a magnetic substance, such as iron and the like, and the cover member serves as a magnetic shield. Unfortunately, in the case where a gap exists between the cover member and the motor case, it is impossible to block an electromagnetic noise coming around through the gap. Accordingly, as a countermeasure against the electromagnetic noise, it is proposed that the electromagnetic noise intruding through the gap between a motor flange and the cover member is reduced by means of extending the cover member covering the circuit board down to a position to contact the motor flange.

In the case of extending the cover member covering the circuit board down to the motor flange, the electromagnetic noise can be reduced; and on the other hand, unfortunately the cover member is electrically connected to a frame ground of the motor case. Since an electrical noise, such as electrostatic discharge (ESD), electrical first transient burst (EFT/B), and the like intrudes on the frame ground of the motor case and an encoder cable, the electrical noise comes in around the encoder circuit. In particular, if such a structure is employed in a small-sized motor, it becomes difficult to isolate the cover member, electrically connected to the frame ground, from the encoder circuit. As a result, there exists a problem that, while the encoder circuit can be protected against the electrical noise, the effect of the electrical noise cannot be reduced so that resistance against the electrical noise becomes deteriorates.

SUMMARY

With the issue described above being taken into consideration, at least an embodiment of the present invention enhances a protection effect for an encoder against a magnetic noise, an electromagnetic noise, and an electrical noise, in a motor provided with the encoder.

In order to solve the issue described above, a motor according to at least an embodiment of the present invention includes: a motor main body provided with a turning shaft and a motor case; a magnet that turns together with the turning shaft; a magnetism sensing element that faces the magnet; a circuit board on which the magnetism sensing element is mounted, the circuit board being provided with a signal ground that is connected to a ground terminal of the magnetism sensing element; a circuit board holder that covers the circuit board from a side of the magnet; and a first shield member that covers the circuit board from a side opposite to the magnet; wherein, the first shield member and the circuit board holder are each made of an electrically-conductive material, and electrically connected to the signal ground.

According to at least an embodiment of the present invention, as described above; in the motor provided with an encoder for detecting a turn of the turning shaft, the encoder is provided with the magnetism sensing element that faces the magnet. The circuit board, on which the magnetism sensing element is mounted, is covered by use of the circuit board holder being connected to the signal ground of an encoder circuit on the circuit board, from a side of the magnet; so that it is possible to reduce an effect of an electromagnetic noise from the side of the magnet, as well as an effect of an electrical noise intruding through a frame ground of the motor, a power supply cable, an encoder cable, or the like. Moreover, since the circuit board is covered with the first shield member, having a signal ground potential, from the side opposite to the magnet, it is possible to reduce an effect of a magnetic noise by a disturbance magnetic field and the like, an effect of an electromagnetic noise, and an effect of an electrical noise, wherein those effects being from the side opposite to the magnet. As a result, the circuit board holder and the first shield member work as a magnetic shield and a shield member having the signal ground potential at both sides; i.e., the side of the magnet and the side opposite to the magnet of the circuit board, respectively; so that it is possible to enhance a protection effect against a magnetic noise and an electromagnetic noise, and furthermore to enhance a protection effect against an electrical noise. Accordingly, an angle error of the encoder can be reduced.

In at least an embodiment of the present invention, the first shield member stretches to an outer circumferential side of the circuit board holder, and the first shield member is electrically connected to the signal ground, by the intermediary of an outer circumferential end part of the circuit board holder. If the first shield member stretches to the outer circumferential side of the circuit board holder in this way, an outer circumferential side of the magnetism sensing element can be covered with the first shield member, and furthermore a gap is unlikely to appear between the circuit board holder and the first shield member. Therefore, it is possible to enhance a protection effect against a magnetic noise and an electromagnetic noise, and an electrical noise so as to obtain a stable protection effect.

In at least an embodiment of the present invention, the first shield member is fixed to the outer circumferential end part of the circuit board holder, by way of any of using an electrically-conductive adhesive, caulking, and press-fitting. According to this arrangement, the first shield member can be connected to a signal ground potential for more certain. Moreover, it is possible to unlikely have a gap between the circuit board holder and the first shield member.

In at least an embodiment of the present invention, the first shield member comprises an end plate part that faces the circuit board at a side opposite to the magnet; and a cylindrical part that stretches to a side of the circuit board, from the end plate part; and there is formed an opening part, by way of cutting a part of the cylindrical part and the end plate part, in a circumferential direction. According to this arrangement, there can be provided a connection port (an opening part) for connecting to a connector placed in the circuit board; and the circuit board can be covered, excluding the connection port. Therefore, even with a simple structure of a connection with the encoder cable, an effect of a magnetic noise, an electromagnetic noise, and an electrical noise can be reduced.

In at least an embodiment of the present invention, the circuit board is fixed to the circuit board holder, by the intermediary of a fixing component that is electrically conductive; and the signal ground and the circuit board holder are electrically connected to each other, by the intermediary of the fixing component. According to this arrangement; by way of a simple structure, the circuit board holder and the signal ground on the circuit board can electrically be connected.

In at least an embodiment of the present invention, the fixing component is a spring pin; and the circuit board includes a fixing hole into which the spring pin is inserted. According to this arrangement; owing to elasticity of the spring pin, loose connection of the circuit board in relation to the circuit board holder can be controlled.

In at least an embodiment of the present invention, the fixing component is placed at two or more locations in number, which are located across a center of the circuit board holder. According to this arrangement, the circuit board can be positioned by use of the fixing component.

In at least an embodiment of the present invention, a second shield member is fixed to the circuit board holder, so as to cover the magnetism sensing element from the side of the magnet; and the second shield member is made of an electrically-conductive material, and electrically connected to the signal ground by the intermediary of the circuit board holder. According to this arrangement, it is possible to effectively reduce an effect of an electromagnetic noise, a frame ground noise, and a power source noise, which intrude from the side of the magnet.

In at least an embodiment of the present invention, the motor includes an encoder holder, having an insulation property, which surrounds an outer circumferential side of the magnet; and the circuit board holder is fixed to the motor case, by the intermediary of the encoder holder. According to this arrangement, a member having a frame ground potential (the motor case) and a member having the signal ground potential (the circuit board holder) can be insulated from each other. Therefore, an effect of the frame ground noise can be reduced.

In at least an embodiment of the present invention, the magnet includes a first magnet that is magnetized with one N-pole and one S-pole in a circumferential direction; and a second magnet that is magnetized with a plurality of N-poles and a plurality of S-poles; each N-pole and each S-pole being alternately placed in a circumferential direction; the magnetism sensing element includes a first magnetism sensing element that faces the first magnet; and a second magnetism sensing element that faces the second magnet; and the second shield member covers the first magnetism sensing element and the second magnetism sensing element. According to this arrangement; two sets of encoders of an absolute type and an incremental type can be configured, and therefore it is possible to carry out position detection, in a high resolution and with a high degree of accuracy, by way of processing the outputs from the two sets of encoders. Moreover, one shield member is able to solely cover all magnetism sensing elements, and therefore shielding the two magnetism sensing elements can easily be carried out.

According to at least an embodiment of the present invention, in the motor provided with the encoder for detecting a turn of the turning shaft; the circuit board, on which the magnetism sensing element facing the magnet is installed, is covered with the circuit board holder connected to the signal ground of the circuit board, from a side of the magnet, so that it becomes possible to reduce an effect of an electromagnetic noise from the side of the magnet as well as an effect of an electrical noise intruding through the frame ground of the motor, the power supply cable, and the like. Moreover, since the circuit board is covered with the first shield member having the signal ground potential, from a side opposite to the circuit board holder, it is possible to reduce an effect of a magnetic noise by a disturbance magnetic field and the like, an effect of an electromagnetic noise, and an effect of an electrical noise, wherein those effects being from a side opposite to the magnet. As a result, the circuit board holder and the first shield member work as a magnetic shield and a shield member having the signal ground potential at both sides; i.e., the side of the magnet and the side opposite to the magnet of the circuit board, respectively. Therefore, it is possible to enhance a protection effect against an electromagnetic noise, and furthermore to enhance a protection effect against an electrical noise. Accordingly, an angle error of the encoder can be reduced.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Figure 1:
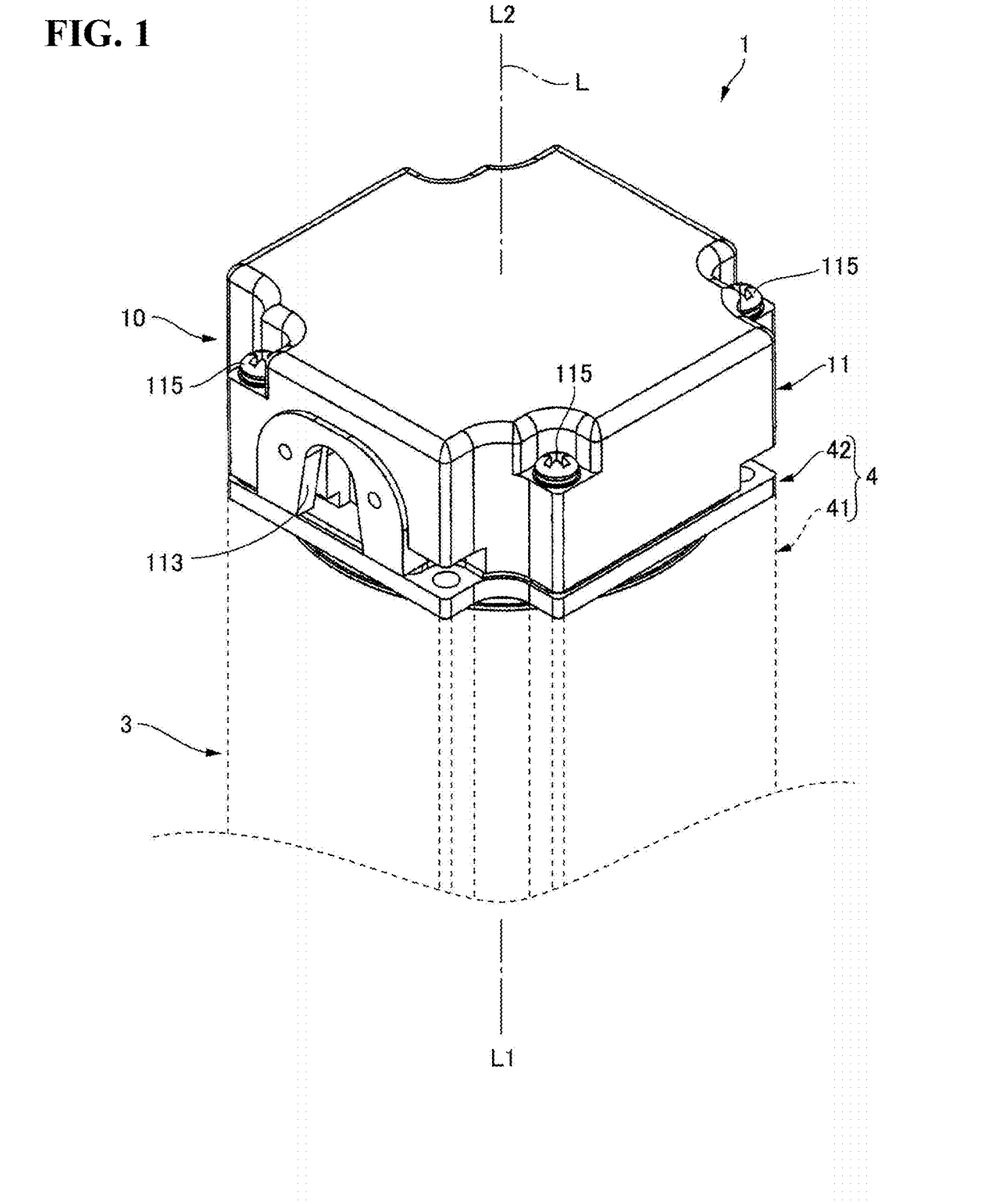
FIG. 1 is an appearance perspective view showing an end part at a side of an encoder of a motor to which at least an embodiment of the present invention is applied.
Figure 2:
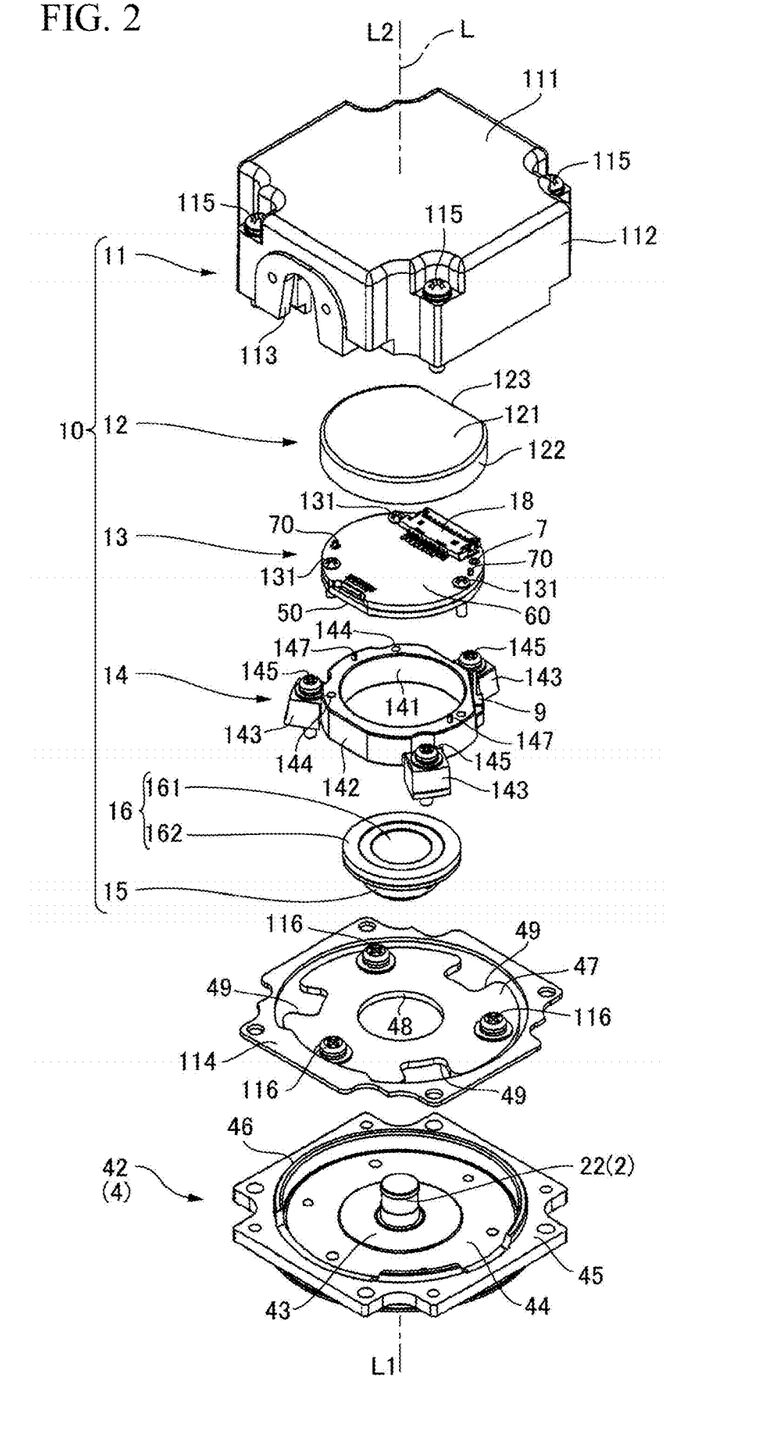
FIG. 2 is an exploded perspective view in which the encoder and a bearing element holder are observed from a counter-output side.
Figure 3:
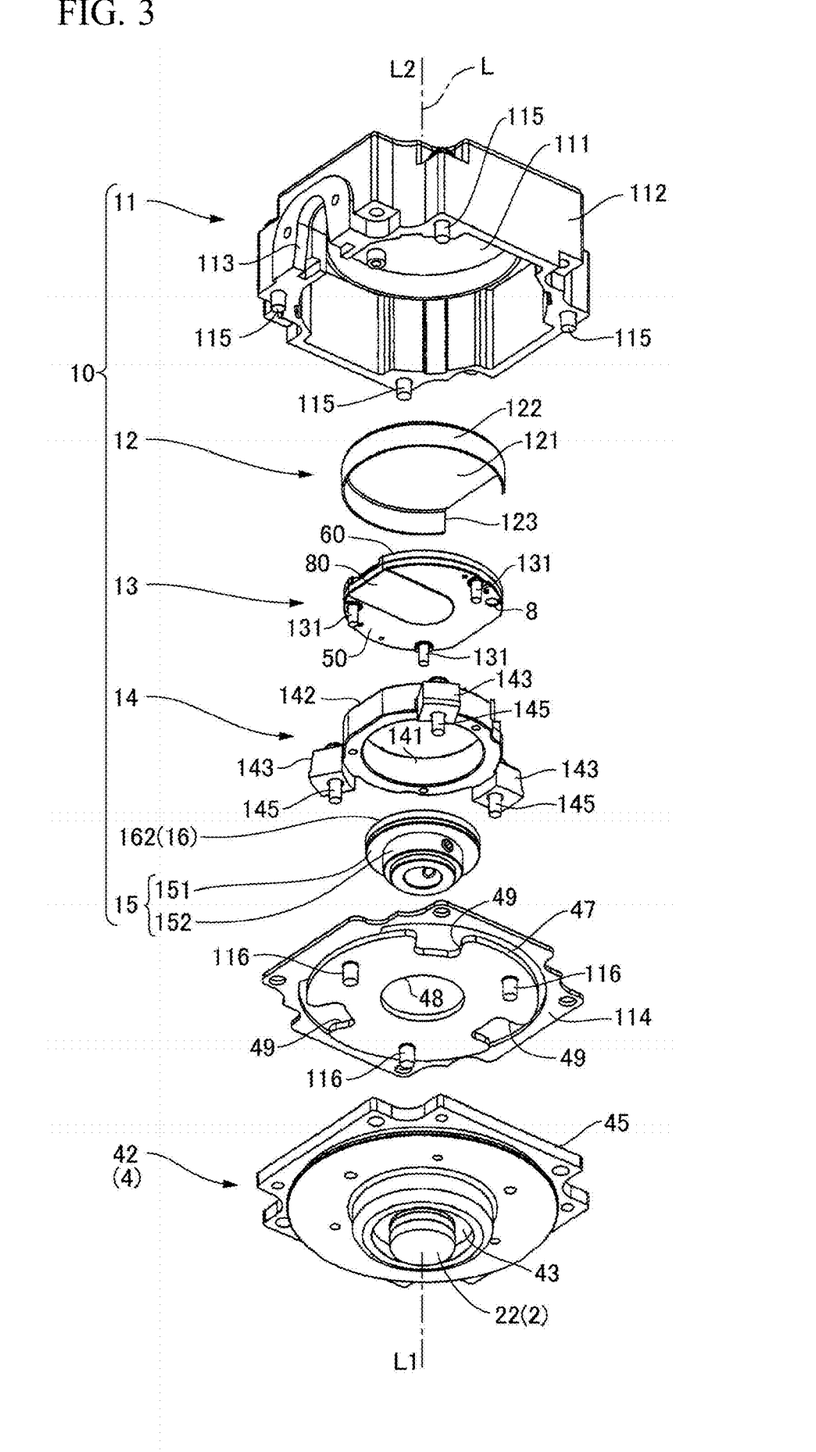
FIG. 3 is an exploded perspective view in which the encoder and the bearing element holder are observed from an output side.
Figure 4:
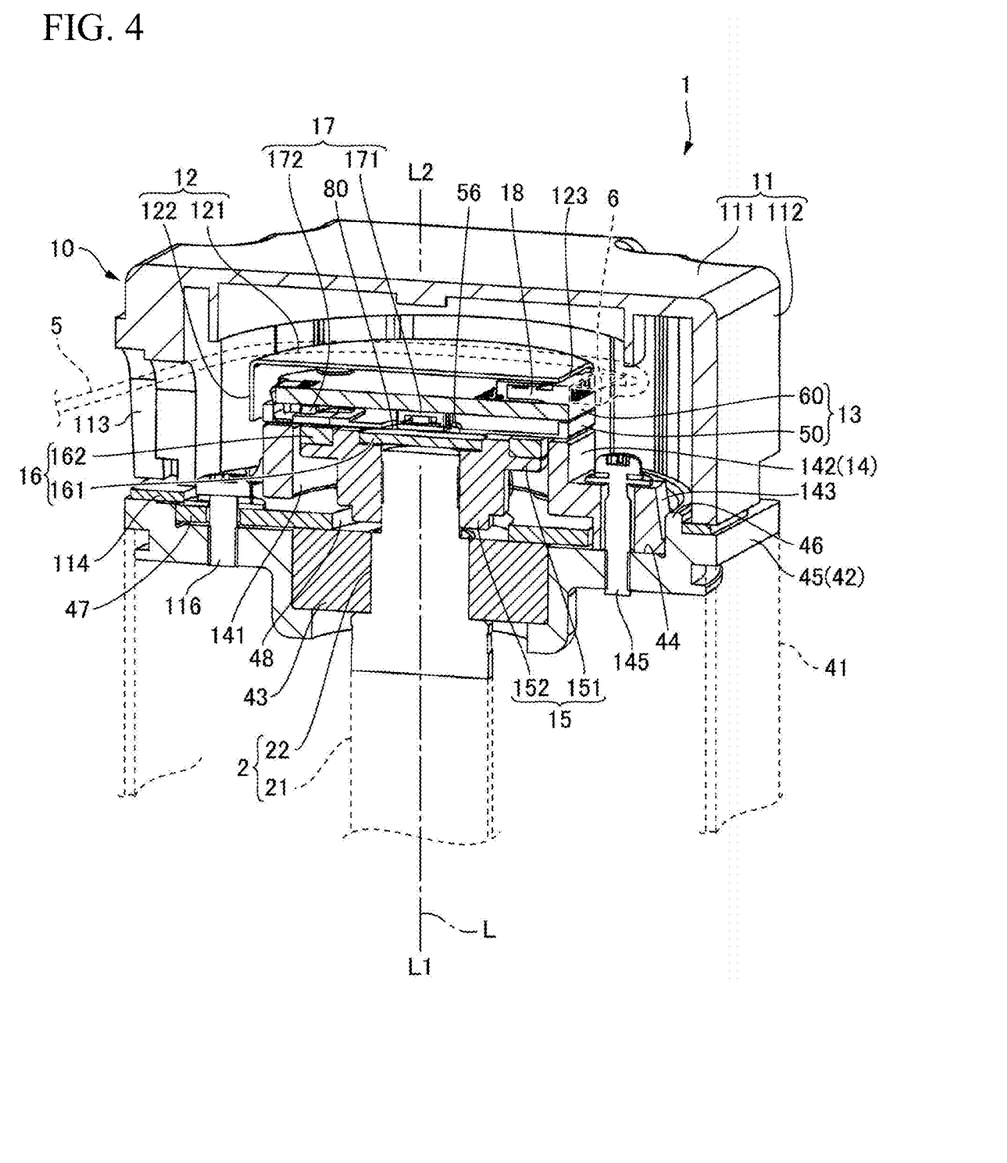
FIG. 4 is a sectional view of the encoder and the bearing element holder.

With reference to the drawings, an embodiment of the motor, to which at least an embodiment of the present invention is applied, is explained below. FIG. 1 is an appearance perspective view showing an end part at a side of an encoder 10 of a motor 1 to which at least an embodiment of the present invention is applied. In the meantime, FIG. 2 and FIG. 3 are exploded perspective views of the encoder 10 and a bearing element holder 42, wherein FIG. 2 is an exploded perspective view observed from a counter-output side, and FIG. 3 is an exploded perspective view observed from an output side. Meanwhile, FIG. 4 is a sectional view of the encoder 10 and the bearing element holder 42.

(General Configuration)

The motor 1 includes a motor main body 3 equipped with a turning shaft 2 (refer to FIG. 4), and the encoder 10 for detecting a turn of the turning shaft 2. The motor main body 3 is provided with a motor case 4 for housing a rotor and stator (not shown in the drawings). The rotor turns, being together with the turning shaft 2. One end part of the turning shaft 2 becomes an output shaft (not shown in the drawings) that protrudes outward from the motor case 4. In the present specification document, a center axis line of the turning shaft 2 is represented with a symbol 'L'. Moreover, a direction, in which the output shaft protrudes out of the motor case 4, is represented as an output side 'L1', and an opposite side of the output side is represented as a counter-output side 'L2'. The encoder 10 is fixed to an end part at the counter-output side 'L2' of the motor main body 3.

(Turning Shaft)

As shown in FIG. 4, the turning shaft 2 is provided with a motor-side turning shaft 21 and an encoder-side turning shaft 22 fixed to an end part at a counter-output side 'L2' of the motor-side turning shaft 21. The motor-side turning shaft 21 and the encoder-side turning shaft 22 turn, being integral with each other. In the present embodiment, the motor-side turning shaft 21 is made of a magnetic material, and meanwhile the encoder-side turning shaft 22 is made of a non-magnetic material. In the case where the encoder-side turning shaft 22 is made of a non-magnetic material, a magnetic noise intruding into the side of the encoder 10, from a side of the motor main body 3 through the encoder-side turning shaft 22, can be reduced. Incidentally, the encoder-side turning shaft 22 may be made of a magnetic material. In such a case, the encoder-side turning shaft 22 and the motor-side turning shaft 21 may be integrated with each other. In other words, the turning shaft 2 may be configured as one component.

(Motor Case)

As shown in FIG. 1, the motor case 4 is provided with a cylindrical case 41 stretching in the direction of the center axis line and the bearing element holder 42 fixed to an end part at a counter-output side 'L2' of the cylindrical case 41. In a view in the direction of the center axis line 'L', the cylindrical case 41 and the bearing element holder 42 are almost rectangular. As shown in FIG. 2, on a surface at a counter-output side 'L2' of the bearing element holder 42, there is formed a circular concave part 44 denting toward an output side 'L1'; and then a flange 45 is formed at an outer circumferential side of the circular concave part 44. At an inner circumferential rim of the flange 45, there is formed an annular wall 46 protruding toward a counter-output side 'L2' along a rim of the circular concave part 44.

As shown in FIG. 2 and FIG. 4, there is supported a bearing element 43 at a bottom center in the circular concave part 44. The bearing element 43 supports an end part at an output side 'L1' of the encoder-side turning shaft 22 so as to be rotatable. Moreover, at a bottom part of the circular concave part 44; there is installed a plate 47, being circular, in such a way as to fasten an outer circumferential part of the bearing element 43 from a counter-output side 'L2'. In the present embodiment, the plate 47 is made of a magnetic material so that a magnetic noise, intruding into a side of the encoder 10 from a side of the motor main body 3, can be reduced. The encoder-side turning shaft 22 protrudes toward the counter-output side 'L2', by way of a through-hole 48 provided at a center of the plate 47. The plate 47 is fixed to the bottom part of the circular concave part 44, with three fixing screws 116. At an outer circumferential edge of the plate 47, there are formed cutout parts 49 at three locations that are placed so as to have the same angular interval. Foot parts 143 of an encoder holder 14, to be described later, are located at the cutout parts 49.

(Encoder)

As shown in FIG. 2 through FIG. 4, the encoder 10 includes: an outer case 11 that is fixed to the bearing element holder 42; a first shield member 12 placed inside the outer case 11; a circuit board unit 13, wherein a counter-output side 'L2' and an outer circumferential side of the circuit board unit 13 being covered with the first shield member 12; an encoder holder 14 that supports the circuit board unit 13; a magnet holder 15 placed at an inner circumferential side of the encoder holder 14; and a magnet 16 that is held by the magnet holder 15. As shown in FIG. 4, the magnet holder 15 is fixed to a top end at a counter-output side 'L2' of the encoder-side turning shaft 22. Therefore, the magnet 16 turns together with the encoder-side turning shaft 22. The circuit board unit 13 is provided with a magnetism sensing element 17 that faces the magnet 16. In the present embodiment, a magnetic resistance (MR) element is used as the magnetism sensing element 17.

(Outer Case)

As shown in FIG. 2 and FIG. 3, the outer case 11 is provided with an end plate part 111 that is almost rectangular in a view in the direction of the center axis line 'L', and a side plate part 112 that rises toward an output side 'L1' from an outer circumferential edge of the end plate part 111. In the side plate part 112, there is formed a cable takeoff port 113 for passing through an encoder cable 5 to be connected to the circuit board unit 13. The outer case 11 and the bearing element holder 42 are fixed to each other by fastening with fixing bolts 115 at four corner sections, with a sealing component 114 existing between an end surface at an output side 'L1' of the side plate part 112 and the flange 45. In the present embodiment, the outer case 11 and the motor case 4 are made of non-magnetic material, such as aluminum.

(Encoder Holder)

As shown in FIG. 2 and FIG. 3, the encoder holder 14 is provided with a torso part 142, where a magnet placement hole 141 being circular is formed, and foot parts 143 protruding out of the torso part 142 in an outer circumferential direction. As shown in FIG. 3, an end surface at an output side 'L1' of the foot parts 143 further protrudes toward the output side 'L1' in comparison to an end surface at an output side 'L1' of the torso part 142. The foot parts 143 are formed at three locations, having the same angular interval in a circumferential direction. The encoder holder 14 is positioned in such a way that; a center axis line 'L' of the encoder-side turning shaft 22, which is so held as to be rotatable at a center of the bearing element holder 42, and the magnet placement hole 141 are coaxially located; and furthermore, the foot parts 143 are located at the cutout parts 49 that are formed at the outer circumferential edge of the plate 47 described above. As shown in FIG. 4, the encoder holder 14 contacts with the bearing element holder 42 in the direction of the center axis line by the intermediary of the foot parts 143. The encoder holder 14 is fixed to the bearing element holder 42, by way of screwing the foot parts 143 onto a bottom surface of the circular concave part 44, by use of fixing screws 145.

In the encoder holder 14, there are formed fixing holes 144 at three locations for fixing the circuit board unit 13, on an end surface at a counter-output side 'L2' of the torso part 142. Furthermore, from the end surface at the counter-output side 'L2' of the torso part 142, two positioning pins 147 protrude, in order to position the circuit board unit 13. The circuit board unit 13 is so positioned as to contact the end surface at the counter-output side 'L2' of the torso part 142, and then fixed to the encoder holder 14 by the intermediary of fixing screws 131.

(Magnet)

As shown in FIG. 3 and FIG. 4, the magnet holder 15 is provided with; a magnet holding part 151 being almost disk-like; and a fixing part 152, being cylindrical, which protrudes toward an output side 'L1' from a center of the magnet holding part 151. A top end of the encoder-side turning shaft 22 is fixed to the fixing part 152, by way of press-fitting, or by use of either adhesive or a set screw, or by way of employing these measures all together. The set screw is screwed into a screw hole that passes through the fixing part 152 in a radial direction, so as to fix the encoder-side turning shaft 22 from a lateral. side. As shown in FIG. 2 and FIG. 4, the magnet 16 includes a first magnet 161, being circular, which fits into a concave part formed at a center of the magnet holding part 151, and a second magnet 162, being annular, which fits to a shoulder part formed around an outer circumferential edge of the first magnet 161. The first magnet 161 is magnetized with one N-pole and one S-pole in a circumferential direction. In the meantime, the second magnet 162 is magnetized with a plurality of N-poles and a plurality of S-poles; each N-pole and each S-pole being alternately placed in a circumferential direction.

As shown in FIG. 4, if the encoder holder 14 is fixed to the bearing element holder 42, the top end of the encoder-side turning shaft 22 is placed at a center of the magnet placement hole 141 of the encoder holder 14. Accordingly, the magnet holder 15 fixed to the top end of the encoder-side turning shaft 22 is placed at the center of the magnet placement hole 141. The first magnet 161 and the second magnet 162 are so placed inside the magnet placement hole 141 as to face the counter-output side 'L2', and moreover coaxially placed with the center axis line 'L' of the encoder-side turning shaft 22 as a center.

(General Configuration of the Circuit Board Unit)

As shown in FIG. 2 through FIG. 4, the circuit board unit 13 includes a circuit board holder 50 and a circuit board 60 that is supported by the circuit board holder 50. The circuit board 60 is almost circular in a view in the direction of the center axis line and provided with a cutout part 61 where one section of an outer circumferential edge is linearly cut out. Meanwhile, the circuit board holder 50 has almost the same shape as the circuit board 60, in a view in the direction of the center axis line 'L'; and then the circuit board 60 and the circuit board holder 50 contact with each other in the direction of the center axis line 'L'. The circuit board 60 is fixed to the circuit board holder 50, by use of a fixing component 70, to be described later, which is electrically conductive. In the circuit board 60, as shown in FIG. 4; there is mounted the magnetism sensing element 17 on a surface at a side of the magnet 16, and meanwhile there is mounted a connector 18 on a surface opposite to the magnet 16. The connector 18 is placed along the cutout part 61 of the circuit board 60. Moreover, a second shield member 80, which covers the magnetism sensing element 17 from a side of the magnet 16, is fixed to the circuit board holder 50. Accordingly, the magnetism sensing element 17 faces the magnet 16 by the intermediary of the second shield member 80. As described later, the second shield member 80 is electrically connected to a signal ground of an encoder circuit on the circuit board 60, by the intermediary of the fixing component 70, which is electrically conductive, and the circuit board holder 50.

(General Configuration of the First Shield Member)

As shown in FIG. 2 and FIG. 3, the first shield member 12 includes; an end plate part 121 that faces the circuit board 60 from a side opposite to the magnet 16 (i.e., a counter-output side 'L2'); and a cylindrical part 122 that rises toward an output side 'L1' from an outer circumferential edge of the end plate part 121. As shown in FIG. 4, the cylindrical part 122 stretches to an outer circumferential side of the circuit board unit 13, so as to cover an outer circumferential side of the magnetism sensing element 17. In the first shield member 12, there is formed an opening part 123, by way of cutting out a part that covers a connection port of the connector 18 on the circuit board 60. The opening part 123 is a cutout that is prepared by cutting a part of the end plate part 121, being circular, and the cylindrical part 122 in a circumferential direction as a planar surface perpendicular to a radial direction, in a view in the direction of the center axis line 'L'. The opening part 123 is formed at a position that overlaps the cutout part 61 of the circuit board 60, in a view in the direction of the center axis line 'L'. As described later, the first shield member 12 is fixed to the circuit board unit 13, and electrically connected to the signal ground of the encoder circuit on the circuit board 60, by the intermediary of the fixing component 70, which is electrically conductive, and the circuit board holder 50.

(Connection Configuration of the Encoder Cable)

As shown in FIG. 4, the connector 18 is placed at a position opposite to the cable takeoff port 113 of the outer case 11, across a center of the circuit board 60 in a radial direction. In the meantime, the opening part 123 of the first shield member 12 is oriented to an opposite side in a radial direction, with regard to the cable takeoff port 113; and the connection port of the connector 18 faces the opening part 123. The encoder cable 5 goes through between the first shield member 12 and the outer case 11 in such a way as to be introduced to the opening part 123. The encoder cable 5 is bent at an outer circumferential side of the opening part 123 in such a way as to turn into a reverse direction, and then a cable-side connector 6 provided at a tip of the encoder cable 5 is connected to the connection port of the connector 18, from a side opposite to the cable takeoff port 113. A connection configuration for shortening a cable length of the encoder cable 5 and the cable-side connector 6 may be employed, by way of orienting the opening part 123 of the first shield member 12 and the connection port of the connector 18 toward the cable takeoff port 113.

Figure 5:
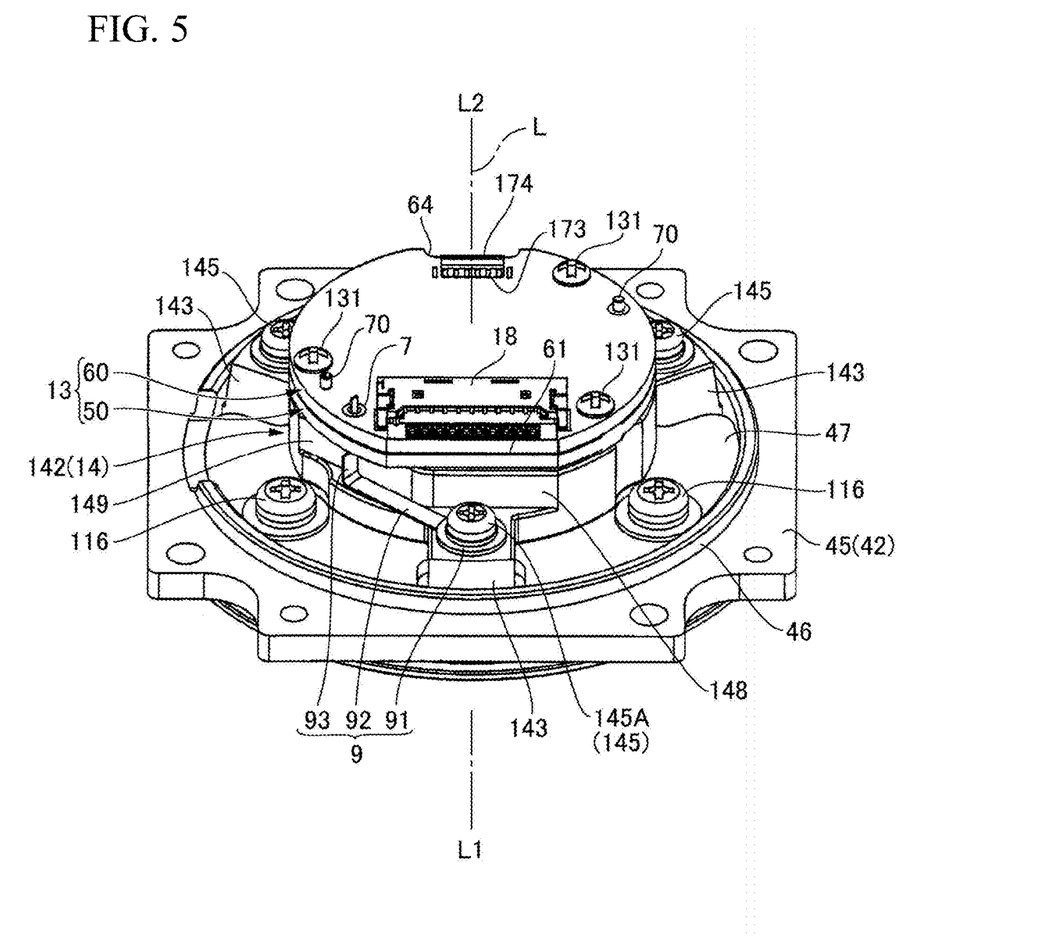
FIG. 5 is a perspective view of the encoder and the bearing element holder, with an outer case being removed.
Figure 6:
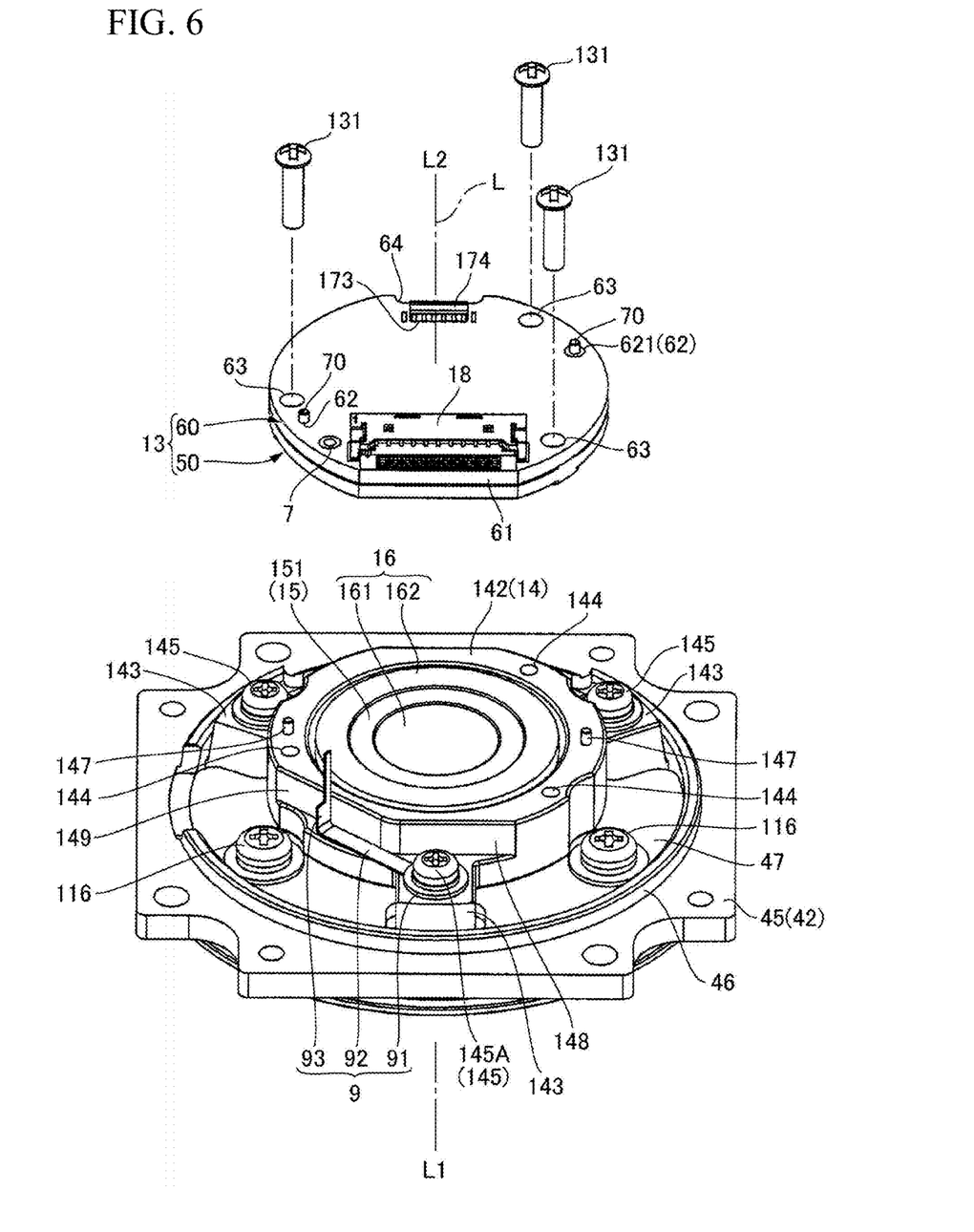
FIG. 6 is an exploded perspective view of the encoder and the bearing element holder, with the outer case being removed.

FIG. 5 is a perspective view of the encoder 10 and the bearing element holder 42, with an outer case 11 being removed; and meanwhile, FIG. 6 is an exploded perspective view of the encoder 10 and the bearing element holder 42, with the outer case 11 being removed. As shown in FIG. 5 and FIG. 6, the circuit board unit 13 is fixed to the encoder holder 14, by use of the fixing screws 131 including three screws. As shown in FIG. 5, one of the fixing screws 145 including three screws, which fixes the encoder holder 14 to the bearing element holder 42, serves as a terminal fixing screw 145A for fixing one of the foot parts 143 and a terminal member 9 while stacking these two components together. The terminal fixing screw 145A is positioned at a center in a circumferential direction of the cutout part 61 of the circuit board 60. The terminal member 9 and the terminal fixing screw 145A are made of metal. Therefore, since the terminal member 9 is electrically connected to the bearing element holder 42 by the intermediary of the terminal fixing screw 145A, the terminal member 9 is electrically connected to a frame ground of the motor case 4.

As shown in FIG. 5 and FIG. 6; in the circuit board 60, a through hole 7 is formed at a position that is lined with the connector 18 in a circumferential direction. Furthermore, in the circuit board holder 50, there is formed a through hole 8 (refer to FIG. 3, FIG. 7 and FIG. 8) at a position that overlaps with the through hole 7 of the circuit board 60, in the direction of the center axis line 'L'. As shown in FIG. 5 and FIG. 6; in the torso part 142 of the encoder holder 14, there are formed a cutout part 148 and a cutout part 149 prepared by cutting a part of an outer circumferential surface in a circumferential direction as a planar surface intersecting with a radial direction. The cutout part 148 is formed at the same position in the circumferential direction as the cutout part 61 of the circuit board 60. In the meantime, the cutout part 149 is formed at the same position in the circumferential direction as the through hole 7 and the through hole 8. In other words; a part of the encoder holder 14, which blocks off the through hole 7 and the through hole 8 from an output side 'L1', is cut out.

The terminal member 9 is provided with a solderless terminal 91 being circular, a first part 92 that linearly stretches on the same plane as the solderless terminal 91, and a second part 93 that bends at almost right angle from an end part opposite to the solderless terminal 91 in the first part 92 so as to stretch toward a counter-output side 'L2'. The first part 92 and the second part 93 are shaped by way of bending a single linear plate material. At a time of fixing the encoder holder 14 to the motor case 4; if the terminal member 9 is fixed at the same time by using one of the fixing screws 145 (the terminal fixing screw 145A), the first part 92 of the terminal member 9 stretches from the terminal fixing screw 145A toward the cutout part 149 of the encoder holder 14 in such a way as to extend along the cutout part 149. If the circuit board unit 13 in this state is positioned in the circumferential direction and fixed to the encoder holder 14 by use of the three fixing screws 131, a tip of the second part 93 of the terminal member 9 comes into a state of passing through the through hole 7 and the through hole 8 of the circuit board unit 13, and moreover protruding from the circuit board 60 toward a counter-output side 'L2'. Then, if the second part 93 of the terminal member 9 is subsequently connected with solder to the through hole 7, the terminal member 9 is electrically connected to a land provided at an edge of the through hole 7.

The cable-side connector 6 of the encoder cable 5 is provided with a frame ground terminal, and meanwhile the connector 18 on the circuit board 60 is provided with a circuit-board-side terminal that is connected to the frame ground terminal. The circuit-board-side terminal is electrically connected to the terminal member 9, connected with solder to the through hole 7, by the intermediary of a wiring pattern on the circuit board 60; and then connected to the frame ground of the motor case 4 by the intermediary of the terminal member. In the meantime, the wiring pattern for connecting the terminal member 9, connected with solder to the through hole 7, and the circuit-board-side terminal of the connector 18 is isolated from the encoder circuit on the circuit board 60, and isolated from the signal ground of the encoder circuit. Meanwhile, the through hole 8 formed in the circuit board holder 50 is somewhat larger than the through hole 7 of the circuit board 60 so that the terminal member 9 does not contact an edge of the through hole 8. Therefore, there is no chance that the circuit board holder 50 is electrically connected to the frame ground of the motor case 4, by the intermediary of the terminal member 9.

If the cable-side connector 6 is connected to the connector 18 on the circuit board 60, the frame ground terminal of the encoder cable 5 is electrically connected to the terminal member 9, connected with solder to the through hole 7 so as to be electrically connected to the bearing element holder 42, by the intermediary of the terminal member 9 and the terminal fixing screw 145A. According to the present embodiment, in other words; at a time of connecting the encoder cable 5 to the circuit board unit 13, only by way of connecting the cable-side connector 6 to the connector 18 of the circuit board 60, the frame ground terminal of the encoder cable 5 gets electrically connected to the frame ground of the motor case 4. Thus, by way of electrically connecting the frame ground terminal of the encoder cable 5 to the frame ground of the motor case 4, it is possible to enhance a protection effect against an electrical noise that intrudes from an outside of the encoder cable 5. Accordingly, resistance of the encoder 10 against a noise can be enhanced.

(Detailed Configuration of the Circuit Board Unit)

Figure 7:
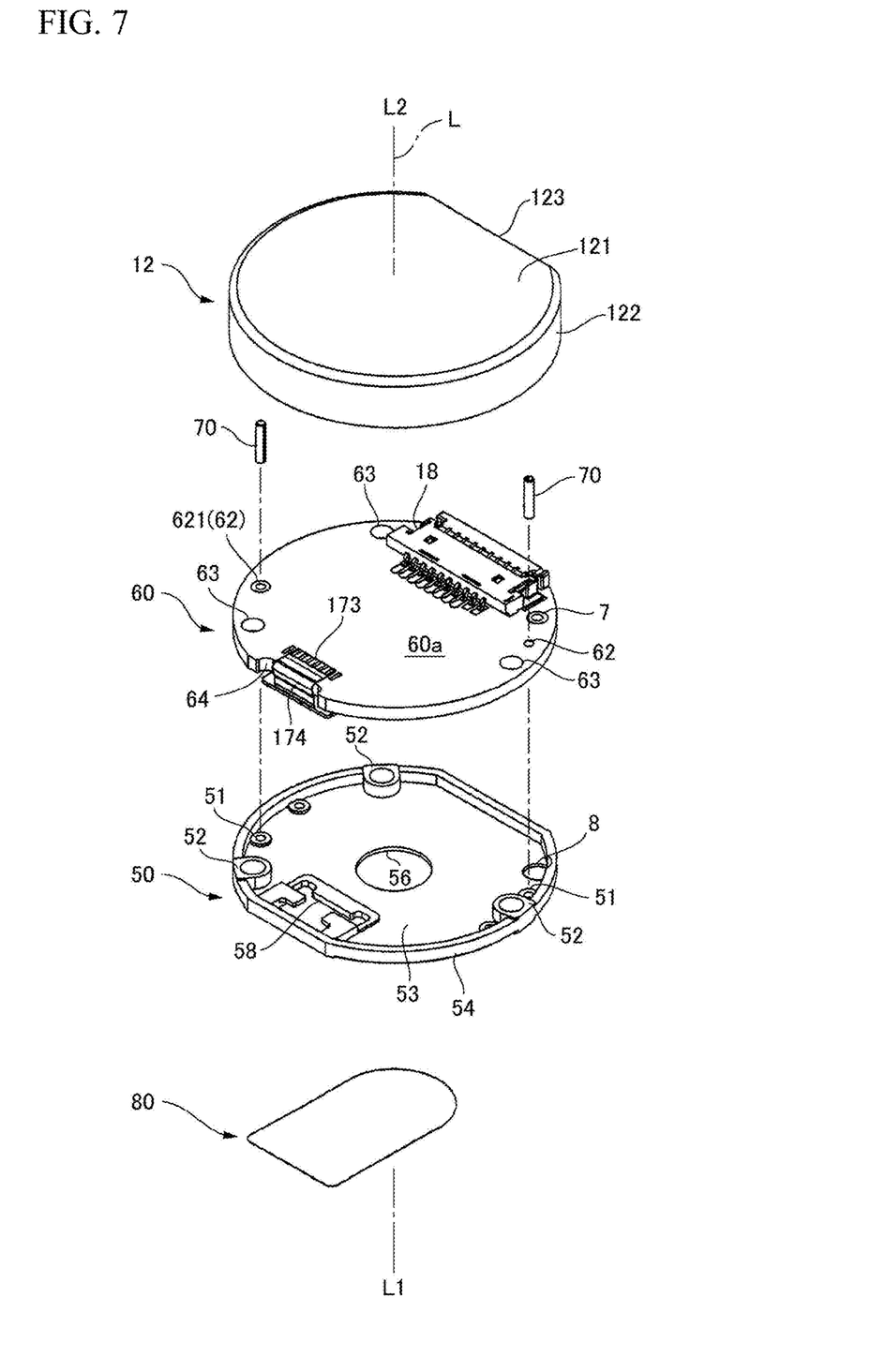
FIG. 7 is an exploded perspective view in which a circuit board unit and a first shield member are observed from a counter-output side.
Figure 8:
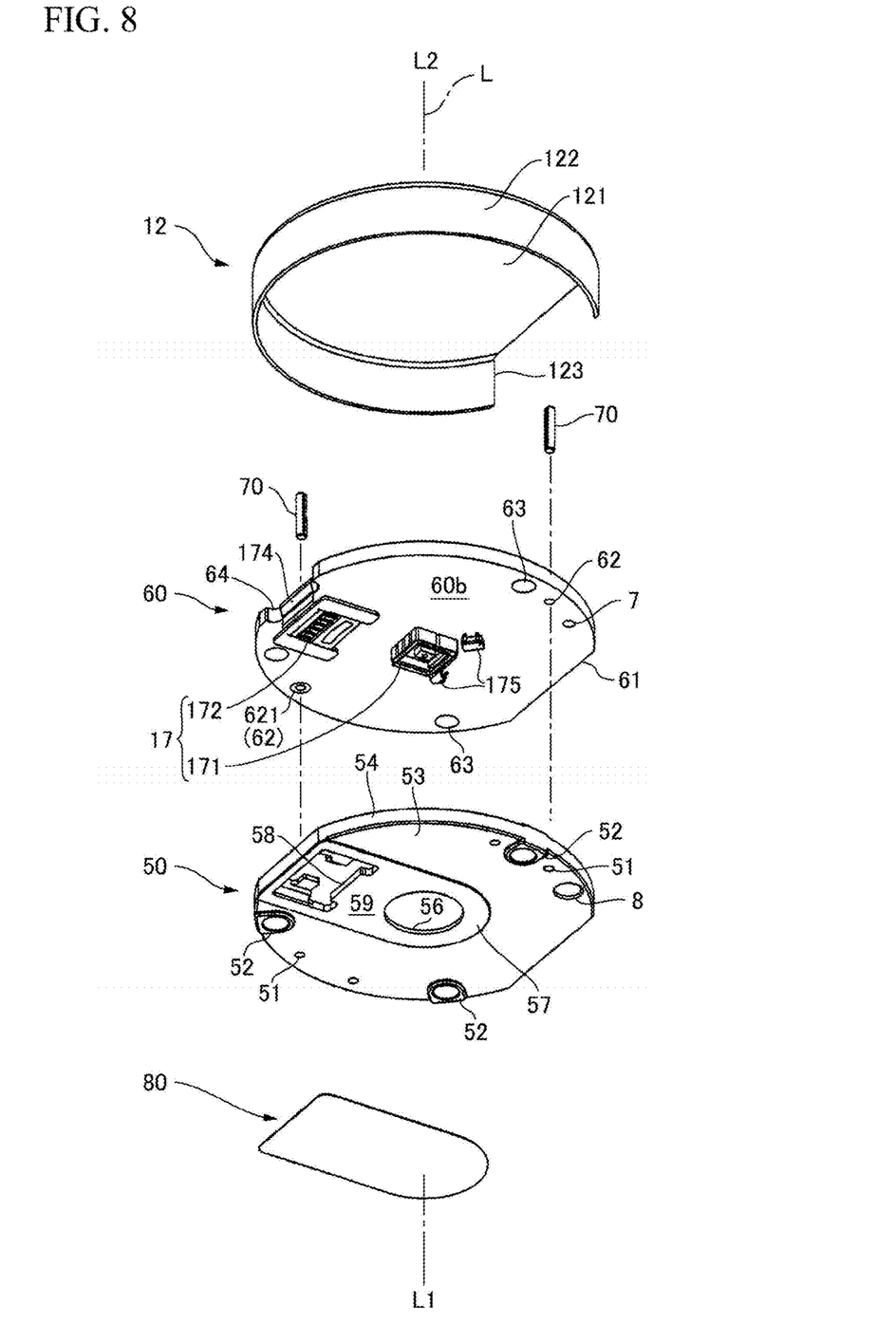
FIG. 8 is an exploded perspective view in which the circuit board unit and the first shield member are observed from an output side.

FIG. 7 is an exploded perspective view in which the circuit board unit 13 and the first shield member 12 are observed from a counter-output side 'L2'; and meanwhile, FIG. 8 is an exploded perspective view in which the circuit board unit 13 and the first shield member 12 are observed from an output side 'L1'. In the circuit board 60, there are formed fixing holes 62 at two locations, for connecting to the circuit board holder 50. The fixing holes 62 at two locations are so placed as to be opposite to each other across a center of the circuit board holder 50. Moreover, one of the fixing holes 62 at the two locations is a ground through hole 621 that is electrically connected to the signal ground of the encoder circuit mounted on the circuit board 60. Incidentally, either of the fixing holes 62 at the two locations may become the ground through hole 621. Furthermore, fixing holes 62 may be provided at three or more locations, and the circuit board 60 and the circuit board holder 50 may be fixed to each other by way of connection at three locations.

The circuit board holder 50 includes an end plate part 53 that faces the circuit board 60, and a side plate part 54 that rises toward a counter-output side 'L2' from an outer circumferential edge of the side plate part 53. The circuit board holder 50 has its shape, in which the end plate part 53 is linearly cut at a position that overlaps with the cutout part 61 of the circuit board 60 in the direction of the center axis line 'L'; and the side plate part 54 linearly extends there. In the end plate part 53, there are formed boss sections 51, at two locations, which correspond to the fixing holes 62 of the circuit board 60. By way of inserting the fixing component 70 into the fixing holes 62 and the boss sections 51, the circuit board 60 is fixed to the circuit board holder 50. The fixing component 70 is a spring pin. Using a spring pin as the fixing component 70 prevents loose connection of the circuit board 60 in relation to the circuit board holder 50. Moreover, the fixing component 70 is made of an electrically-conductive metal, for example stainless steel (SUS material); and meanwhile, the circuit board holder 50 is made of an electrically-conductive metal, for example aluminum. Therefore, if the circuit board 60 is installed to the circuit board holder 50 by use of the fixing component 70, the circuit board holder 50 is electrically connected to the signal ground of the encoder circuit mounted on the circuit board 60, by the intermediary of the fixing component 70 and the ground through hole 621.

In the circuit board holder 50, there are formed boss sections 52 for putting the fixing screws 131 through, at three locations, which correspond to the fixing holes 144 of the encoder holder 14. The boss sections 52 are connected to the side plate part 54. In the present embodiment, a top surface of the boss sections 52 becomes a contact surface that contacts with the circuit board 60. Meanwhile, in the circuit board 60, there are formed fixing holes 63 for putting the fixing screws 131 through, at three locations, which correspond to the boss sections 52 and the fixing holes 144.

The circuit board unit 13 is fixed to the encoder holder 14, by way of putting the three fixing screws 131 individually through the fixing holes 63 of the circuit board 60 and the boss sections 52 of the circuit board holder 50, and setting top parts of the fixing screws 131 to the fixing holes 144 with screws. Moreover, the encoder holder 14 is fixed by use of the foot parts 143 contacting the bearing element holder 42; and therefore, the circuit board unit 13 is fixed to the bearing element holder 42 by the intermediary of the encoder holder 14. In the present embodiment, the encoder holder 14 is made of an insulating material, such as resin. Accordingly, when the circuit board unit 13 is fixed to the bearing element holder 42 by the intermediary of the encoder holder 14, the circuit board holder 50 is insulated from the bearing element holder 42. Meanwhile, in the circuit board 60, only the wiring pattern for the frame ground to be connected to the terminal member 9, as described above, is electrically connected to the bearing element holder 42; and the encoder circuit is insulated from the bearing element holder 42.

The circuit board 60 is provided with a counter-output side circuit board surface 60a that faces a counter-output side 'L2', and an output side circuit board surface 60b that faces an output side 'L1'. As shown in FIG. 7, on the counter-output side circuit board surface 60a; there are mounted a circuit element, being not shown, which makes up the encoder circuit; the connector 18 for connecting the encoder cable 5; a connection terminal 173, and the like. The connection terminal 173 is placed at an outer circumferential edge of the circuit board 60; while being placed at a side opposite to the connector 18, across the center of the circuit board 60. At the outer circumferential edge of the circuit board 60, there is formed a cutout part 64 at an outer side of the connection terminal 173 in a radial direction. As shown in FIG. 8, the magnetism sensing element 17 includes a first magnetism sensing element 171 placed at a center of the output side circuit board surface 60b, and a second magnetism sensing element 172 to be connected to the connection terminal 173 by the intermediary of a flexible wiring board 174. Passing through the cutout part 64 of the circuit board 60, the flexible wiring board 174 is introduced to an output side 'L1' of the circuit board 60. The first magnetism sensing element 171 and the second magnetism sensing element 172 are each provided with a ground terminal (not shown), which is connected to the signal ground of the encoder circuit made up on the circuit board 60. Moreover, on the output side circuit board surface 60b, there are installed two Hall elements 175 in the vicinity of the first magnetism sensing element 171. The two Hall elements 175 are placed at positions that are 90-degree angularly distant from each other.

In the circuit board holder 50, there is formed a first through hole 56, being circular, at a center of the end plate part 53. Moreover, in the circuit board holder 50, there is formed a stepped part 57 that protrudes toward a output side 'L1', on the surface facing the output side 'L1' of the end plate part 53. The stepped part 57 includes a part that is annularly shaped around the first through hole 56, and a part that stretches like a belt having a constant width, up to the outer circumferential edge of the end plate part 53. In a section close to an outer circumference of the stepped part 57, there is formed a second through hole 58, being almost rectangular. At a time of fixing the circuit board 60 to the circuit board holder 50, the first magnetism sensing element 171 and the Hall elements 175 are placed in the first through hole 56. Furthermore, in the second through hole 58, there is placed the second magnetism sensing element 172 that is connected to the connection terminal 173 on the circuit board 60, by the intermediary of the flexible wiring board 174.

When the circuit board unit 13 is fixed to the encoder holder 14, the first magnetism sensing element 171 placed in the first through hole 56 of the circuit board holder 50, and the first magnet 161 face each other (refer to FIG. 4). Moreover, the second magnetism sensing element 172 placed in the second through hole 58 of the circuit board holder 50, and the second magnet 162 face each other. In the encoder 10, a predetermined gap is individually made up between a surface of the first magnetism sensing element 171 at an output side 'L1' and the first magnet 161, as well as between a surface of the second magnetism sensing element 172 at an output side 'L1' and the second magnet 162.

The first magnetism sensing element 171 and the two Hall elements 175, placed in the vicinity of the first magnetism sensing element 171, and the first magnet 161 serve as an absolute encoder, when a cycle of an output of the first magnetism sensing element 171 obtained in one rotation is determined by the two Hall elements 175. In the meantime, the second magnetism sensing element 172 and the second magnet 162 serve as an incremental encoder, since an output including a plurality of cycles can be obtained in one rotation. The encoder 10 is able to carry out position detection, in a high resolution and with a high degree of accuracy, by way of processing the outputs from these two sets of encoders.

(The Second Shield Member)

The second shield member 80 is fixed to the stepped part 57 of the circuit board holder 50, from a counter-output side 'L2'. The second shield member 80 is made of a flexible sheet material, and so sized as to fully cover the first through hole 56 and the second through hole 58, which are formed in the stepped part 57. The stepped part 57 is provided with a shield mounting surface 59 that faces a counter-output side 'L2', and the second shield member 80 contacts with the shield mounting surface 59. The second shield member 80 is made of an electrically-conductive non-magnetic metal, for example aluminum, in the same way as the circuit board holder 50 is. Then, the second shield member 80 is stuck to the shield mounting surface 59 by the intermediary of an electrically-conductive adhesive. Accordingly, the second shield member 80 is electrically connected to the signal ground of the encoder circuit mounted on the circuit board 60, by the intermediary of the circuit board holder 50.

The second shield member 80 is fixed to the circuit board holder 50 in such a way as to cover the first magnetism sensing element 171 placed in the first through hole 56, and the second magnetism sensing element 172 placed in the second through hole 58. By way of fixing the second shield member 80 to the circuit board holder 50, the first magnetism sensing element 171 and the second magnetism sensing element 172 are protected from the motor main body 3, by use of members having a signal ground potential (the circuit board holder 50 and the second shield member 80). Therefore, it is possible to effectively block a frame ground noise, a power source noise and the like, coming around through a gap between the first magnet 161 and the second magnet 162. Incidentally, the first magnetism sensing element 171 and the second magnetism sensing element 172 face the first magnet 161 and the second magnet 162, by the intermediary of the second shield member 80; and, since the second shield member 80 is made of non-magnetic metal, fortunately it is possible to avoid impairment of a function as a magnetic encoder, while an electromagnetic noise is blocked in a favorable manner.

(Configuration of Fixing the First Shield Member to the Circuit Board Unit)

Figure 9:
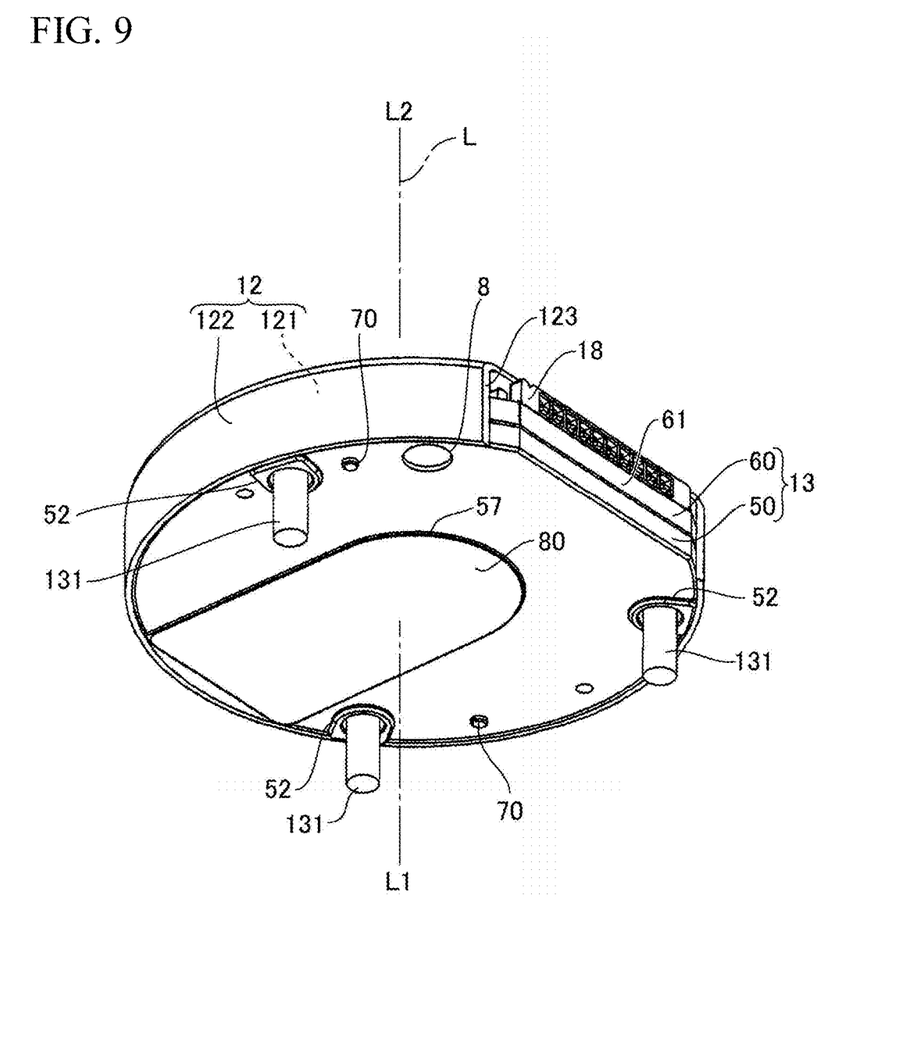
FIG. 9 is a perspective view in which the circuit board unit and the first shield member are observed from the output side.
Figure 10:
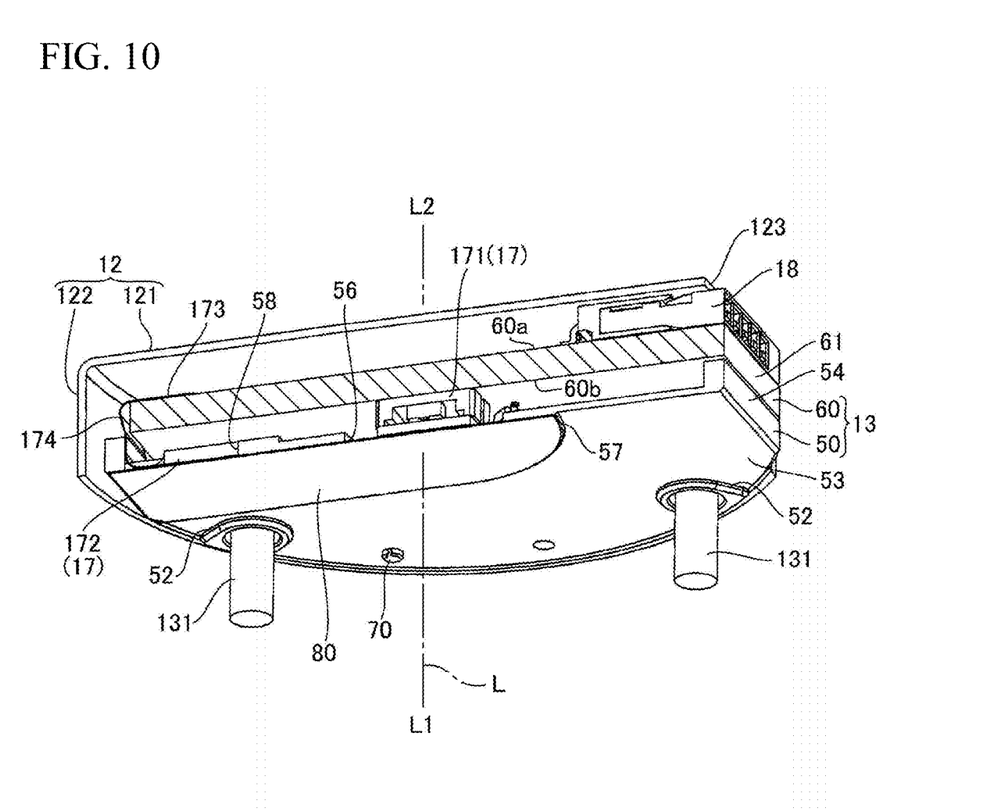
FIG. 10 is a sectional view of the circuit board unit and the first shield member.

FIG. 9 is a perspective view in which the circuit board unit 13 and the first shield member 12 are observed from an output side 'L1', and meanwhile FIG. 10 is a sectional view of the circuit board unit 13 and the first shield member 12. As described above, the cylindrical part 122 of the first shield member 12 stretches to the outer circumferential side of the circuit board unit 13, and a top end of the cylindrical part 122 further protrudes toward the output side 'L1' than an outer circumferential end part of the circuit board holder 50. Therefore, the cylindrical part 122 further stretches to a position toward the output side 'L1' than the magnetism sensing element 17 mounted on the circuit board 60, in such a way that the cylindrical part 122 surrounds an outer circumferential side of the magnetism sensing element 17. The cylindrical part 122 of the first shield member 12 is fixed to an outer circumferential end part of the circuit board unit 13 by use of an electrically-conductive adhesive material. Accordingly, the first shield member 12 is electrically connected to the signal ground of the encoder circuit mounted on the circuit board 60, by the intermediary of the outer circumferential end part of the circuit board holder 50. With regard to the first shield member 12, a gap between the first shield member 12 and the circuit board unit 13 is blocked off by use of the electrically-conductive adhesive material; excluding a position in the circumferential direction, where the opening part 123 is formed, and a position in the circumferential direction, where the cutout part 64 of the circuit board 60 is formed. Incidentally, assembling work may be implemented by way of press fitting or caulking in such a way as to have no gap between the first shield member 12 and the circuit board unit 13.

The first shield member 12 is made of a magnetic material having electrical conductivity. For example, the first shield member 12 is formed of iron, permalloy, or the like. In the present embodiment, the first shield member 12 is made of a magnetic metal; such as SPCC, SPCE, or the like. Thus, by way of covering the circuit board unit 13, which holds the magnetism sensing element 17, from a side opposite to the magnet 16, with the first shield member 12 formed of the magnetic material; it is possible to absorb a magnetic noise by a disturbance magnetic field and the like, and an electromagnetic noise, by use of the magnetic metal, in such a way as to protect the magnetism sensing element 17 and the encoder circuit against the magnetic noise and the electromagnetic noise. Furthermore, according to the present embodiment; by way of assembling work in such a way as to block up the gap between the first shield member 12 and the circuit board unit 13, it is possible to control a magnetic noise and an electromagnetic noise, intruding through the gap between the first shield member 12 and the circuit board unit 13, so that it is possible to enhance a protection effect against the magnetic noise and the electromagnetic noise.

Moreover, the first shield member 12 is electrically connected to the signal ground of the encoder circuit; and therefore the circuit board 60, on which the magnetism sensing element 17 is mounted, is covered with the member having a signal ground potential (the first shield member 12) from a counter-output side 'L2' as well as an outer circumferential side; and furthermore covered with the members having a signal ground potential (the circuit board holder 50 and the second shield member 80) from an output side 'L1'. In other words, the circuit board 60, on which the magnetism sensing element 17 is mounted, is covered with the members having the signal ground potential from all directions. Accordingly, the magnetism sensing element 17 and the encoder circuit can be protected against an electrical noise, in all directions. Therefore, it is possible to enhance a protection effect against an electrical noise; such as a frame ground noise from the motor case 4, a power source noise from a power supply cable, an electrical noise from the encoder cable 5, and the like.

(Primary Function Effect of the Present Embodiment)

As described above, according to the present embodiment; in the motor 1 provided with the encoder 10 for detecting a turn of the turning shaft 2; the circuit board 60, on which the magnetism sensing element 17 of the encoder 10 is mounted, is covered by use of the circuit board holder 50 being electrically connected to the signal ground of the encoder circuit on the circuit board 60, from a side of the magnet 16. Therefore, it is possible to reduce an effect of a magnetic noise and an electromagnetic noise from a side of the magnet 16, as well as an effect of an electrical noise intruding through the frame ground of the motor 1, the power supply cable, and the like. Moreover, since the circuit board 60 is covered with the first shield member 12, having the signal ground potential, from the side opposite to the circuit board holder 50, it is possible to reduce an effect of a magnetic noise by a disturbance magnetic field and the like, an effect of an electromagnetic noise, and an effect of an electrical noise, wherein those effects being from a side opposite to the magnet 16.

In other words, according to at least an embodiment of the present invention; the circuit board holder 50 and the first shield member 12 work as a magnetic shield member and a shield member having the signal ground potential at both sides; i.e., an output side 'L1' and a counter-output side 'L2'

(a side of the magnet 16 and a side opposite to the magnet 16), of the circuit board 60, respectively. Therefore, it is possible to enhance a protection effect against the frame ground noise intruding through the frame ground and the power source noise, as well as a protection effect against the electrical noise intruding through the encoder cable 5. Accordingly, it is possible to enhance a protection effect against the magnetic noise and the electromagnetic noise, and furthermore to enhance a protection effect against the electrical noise, so that an angle error of the encoder 10 can be reduced.

In the encoder 10 according to the present embodiment, the first shield member 12 stretches to an outer circumferential side of the circuit board holder 50, and the first shield member 12 is electrically connected to the circuit board holder 50 by use of an electrically-conductive adhesive material. According to this configuration, the first shield member 12 can cover even a range of thickness of the circuit board 60, in such a way that a gap is unlikely to appear between the circuit board 60 and the first shield member 12. Therefore, it is possible to enhance a protection effect against the magnetic noise, the electromagnetic noise, and the electrical noise so as to obtain a stable protection effect. Furthermore, the first shield member 12 can be sized in accordance with the size of the circuit board holder 50, and therefore it is possible to downsize the first shield member 12. Moreover, in the case where an external dimension of the motor 1 is changed; although a shield member may sometimes be modified according to the external dimension of the motor 1, it is unnecessary in the present application to change the size of the first shield member 12 so that standardization of the part can be implemented, being independent of the external dimension of the motor 1. Accordingly, this configuration is advantageous, as far as a cost reduction is concerned.

Incidentally, without using an electrically-conductive adhesive material; either the circuit board holder 50 may be press-fitted into the cylindrical part 122 of the first shield member 12, or the cylindrical part 122 may be fixed to the circuit board holder 50 by way of caulking. By way of fixing the cylindrical part 122 through either press-fitting or caulking, it is possible to make the first shield member 12 and the circuit board holder 50 contact with each other, in order to electrically connect these two. Moreover, in this case, a gap is unlikely to appear between the circuit board 60 and the first shield member 12. Therefore, the same function effect can be materialized, as it is obtained by use of an electrically-conductive adhesive material.

In the first shield member 12 according to the present embodiment, there is formed the opening part 123 by way of partially cutting out a section of the cylindrical part 122 and the end plate part 121 in a circumferential direction, as a planar surface perpendicular to a radial direction. Owing to a shape of the member, the circuit board unit 13 can be covered, excluding a part of the connection port for connecting to the connector 18. Accordingly, even with a simple structure of the connection with the encoder cable 5, an effect of reducing the magnetic noise, the electromagnetic noise, and the electrical noise can be obtained.

In the present embodiment; the circuit board 60, on which the magnetism sensing element 17 is mounted, is fixed to the circuit board holder 50 by the intermediary of the fixing component 70 being electrically-conductive, and meanwhile the signal ground and the circuit board holder 50 are electrically connected to each other, by way of the ground through hole 621 provided to the circuit board 60 and the fixing component 70. Therefore, by way of the simple structure, the circuit board holder 50 and the signal ground of the encoder circuit on the circuit board 60 can electrically be connected.

Sine the fixing component 70 is a spring pin, loose connection of the circuit board 60 in relation to the circuit board holder 50 can be controlled owing to elasticity of the spring pin. Accordingly, displacement of the circuit board can be controlled. In the meantime, the fixing component 70 is placed at two locations in number, which are located across the center of the circuit board holder 50. Therefore, the circuit board 60 can be positioned by use of the fixing component 70.

Moreover, the encoder 10 according to the present embodiment has the second shield member 80 being flexible, which covers the magnetism sensing element 17 from a side of the magnet 16; and then the second shield member 80 is fixed to the circuit board holder 50, and electrically connected to the signal ground of the encoder circuit on the circuit board 60 by the intermediary of the circuit board holder 50. Therefore, it is possible to effectively reduce an effect of a frame ground noise, as well as a power source noise and an electromagnetic noise, which intrude from the side of the magnet 16.

Thus, by way of not only connecting the first shield member 12 and the circuit board holder 50 to the signal ground, but also covering the first through hole 56 and the second through hole 58, of the circuit board holder 50, by use of the second shield member 80 having a signal ground potential; the circuit board 60, on which the magnetism sensing element 17 is mounted, is covered with the members having the signal ground potential from all directions. Accordingly, the magnetism sensing element 17 and the encoder circuit can be protected against an electrical noise, in all directions. Therefore, it is possible to enhance a protection effect against an electrical noise; such as a frame ground noise from the motor case 4, a power source noise from a power supply cable, an electrical noise from the encoder cable 5, and the like.

The encoder 10 according to the present embodiment includes the encoder holder 14, having an insulation property, which surrounds an outer circumferential side of the magnet 16 and the magnet holder 15; and meanwhile, the circuit board holder 50 is fixed to the bearing element holder 42, by the intermediary of the encoder holder 14. Thus, a member having a frame ground potential (the bearing element holder 42) and a member having the signal ground potential (the circuit board holder 50) can be insulated from each other, so that an effect of the frame ground noise on the encoder circuit can be reduced.

In the present embodiment, there are provided two sets of the magnetism sensing element 17 and the magnet 16 (the first magnetism sensing element 171 and the first magnet 161, as well as the second magnetism sensing element 172 and the second magnet 162) in order to make up two sets of encoders of an absolute type and an incremental type, and therefore it is possible to carry out position detection, in a high resolution and with a high degree of accuracy. Moreover, the second shield member 80 is able to solely cover the first magnetism sensing element 171 and the second magnetism sensing element 172; and therefore, shielding the magnetism sensing element 17 from the magnet 16 can easily be carried out.

What is claimed is:
1. A motor comprising:
a motor main body comprising a turning shaft and a motor case;

a magnet that turns together with the turning shaft;
a magnetism sensing element that faces the magnet;
a circuit board on which the magnetism sensing element is mounted, the circuit board comprising a signal ground that is connected to a ground terminal of the magnetism sensing element;
a circuit board holder that covers the circuit board from a side of the magnet; and
a first shield member that covers the circuit board from a side opposite to the magnet;
wherein the first shield member and the circuit board holder are each made of an electrically-conductive material, and electrically connected to the signal ground.

2. The motor according to claim 1;
wherein the first shield member stretches to an outer circumferential side of the circuit board holder, and the first shield member is electrically connected to the signal ground, by the intermediary of an outer circumferential end part of the circuit board holder.

3. The motor according to claim 2;
wherein the first shield member is fixed to the outer circumferential end part of the circuit board holder, by way of any of using an electrically-conductive adhesive, caulking, and press-fitting.

4. The motor according to claim 1;
wherein, the first shield member comprises an end plate part that faces the circuit board at a side opposite to the magnet; and a cylindrical part that stretches to a side of the circuit board, from the end plate part; and
there is formed an opening part, by way of cutting a part of the cylindrical part and the end plate part, in a circumferential direction.

5. The motor according to claim 1;
wherein the circuit board is fixed to the circuit board holder, by the intermediary of a fixing component that is electrically conductive; and
the signal ground and the circuit board holder are electrically connected to each other, by the intermediary of the fixing component.

6. The motor according to claim 5;
wherein the fixing component is a spring pin; and
the circuit board comprises a fixing hole into which the spring pin is inserted.

7. The motor according to claim 5;
wherein the fixing component is placed at two or more locations in number, which are located across a center of the circuit board holder.

8. The motor according to claim 1;
wherein a second shield member is fixed to the circuit board holder, so as to cover the magnetism sensing element from the side of the magnet; and
the second shield member is made of an electrically-conductive material, and electrically connected to the signal ground by the intermediary of the circuit board holder.

9. The motor according to claim 8;
wherein the motor includes an encoder holder, having an insulation property, which surrounds an outer circumferential side of the magnet; and
the circuit board holder is fixed to the motor case, by the intermediary of the encoder holder.

10. The motor according to claim 9;
wherein the magnet comprises a first magnet that is magnetized with one N-pole and one S-pole in a circumferential direction; and a second magnet that is magnetized with a plurality of N-poles and a plurality of S-poles; each N-pole and each S-pole being alternately placed in a circumferential direction;
the magnetism sensing element comprises a first magnetism sensing element that faces the first magnet; and a second magnetism sensing element that faces the second magnet; and
the second shield member covers the first magnetism sensing element and the second magnetism sensing element.

11. The motor according to claim 1;
wherein the motor comprises an encoder holder, having an insulation property, which surrounds an outer circumferential side of the magnet; and
the circuit board holder is fixed to the motor case, by the intermediary of the encoder holder.

12. The motor according to claim 8;
wherein the magnet comprises a first magnet that is magnetized with one N-pole and one S-pole in a circumferential direction; and a second magnet that is magnetized with a plurality of N-poles and a plurality of S-poles; each N-pole and each S-pole being alternately placed in a circumferential direction;
the magnetism sensing element comprises a first magnetism sensing element that faces the first magnet; and a second magnetism sensing element that faces the second magnet; and
the second shield member covers the first magnetism sensing element and the second magnetism sensing element.

* * * * *